United States Patent
Tanaka

(10) Patent No.: US 9,407,113 B2
(45) Date of Patent: Aug. 2, 2016

(54) ELECTRONIC DEVICE, IMAGE PROCESSING APPARATUS, AND DEVICE CONTROL METHOD

(71) Applicant: Satoshi Tanaka, Tokyo (JP)

(72) Inventor: Satoshi Tanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 676 days.

(21) Appl. No.: 13/755,375

(22) Filed: Jan. 31, 2013

(65) Prior Publication Data

US 2013/0214603 A1 Aug. 22, 2013

(30) Foreign Application Priority Data

Feb. 16, 2012 (JP) ................. 2012-031878

(51) Int. Cl.
*H02J 9/04* (2006.01)
*H02J 9/06* (2006.01)

(52) U.S. Cl.
CPC . *H02J 9/04* (2013.01); *H02J 9/061* (2013.01); *Y10T 307/625* (2015.04)

(58) Field of Classification Search
CPC .................................. H02J 9/04; H02J 9/061
USPC ........................................................ 307/66
See application file for complete search history.

(56) References Cited

U.S. PATENT DOCUMENTS

| | | | | | |
|---|---|---|---|---|---|
| 5,281,955 | A | * | 1/1994 | Reich ................. | G01R 31/3624 320/136 |
| 5,915,122 | A | * | 6/1999 | Tsurumi ................ | G06F 1/184 711/101 |
| 6,710,809 | B1 | * | 3/2004 | Niikawa ................ | H04N 5/232 348/333.01 |
| 7,808,209 | B2 | * | 10/2010 | Fukute ............... | G01R 31/3624 320/132 |

(Continued)

FOREIGN PATENT DOCUMENTS

| | | |
|---|---|---|
| JP | 5-30240 A | 2/1993 |
| JP | H11-223666 | 8/1999 |

(Continued)

OTHER PUBLICATIONS

Japanese Office Action issued Oct. 13, 2015 in Patent Application No. 2012-031878 (without English Translation).

(Continued)

*Primary Examiner* — Kenneth B Wells
*Assistant Examiner* — James P Evans
(74) *Attorney, Agent, or Firm* — Oblon, McClelland, Maier & Neustadt, L.L.P

(57) ABSTRACT

An electronic device includes a detecting unit configured to detect cut-off of a main power supply; a power storage unit configured to store power; a sensing unit configured to sense an amount of remaining power of the power storage unit; a determining unit configured to determine whether a functional operation designated by a user is completed with the amount of remaining power sensed by the sensing unit in a cut-off condition of the main power supply detected by the detecting unit; and an operation control unit configured to control execution of the functional operation in the cut-off condition when the determining unit determines that the functional operation is completed with the amount of remaining power.

11 Claims, 9 Drawing Sheets

(56) References Cited

U.S. PATENT DOCUMENTS

| | | | |
|---|---|---|---|
| 2001/0045771 A1* | 11/2001 | Corio | B60T 8/1703 303/20 |
| 2007/0188144 A1* | 8/2007 | Hara | G06F 1/3203 320/132 |
| 2008/0288194 A1* | 11/2008 | Comery | G01R 31/3651 702/63 |
| 2009/0066529 A1* | 3/2009 | Fukada | G01R 31/3689 340/657 |
| 2010/0141104 A1* | 6/2010 | Beaudet | A47L 15/4293 312/228 |
| 2011/0066872 A1* | 3/2011 | Miller | G06F 1/30 713/340 |
| 2011/0072292 A1* | 3/2011 | Khawand | G06F 1/3203 713/340 |
| 2011/0234419 A1* | 9/2011 | Churbock | A61G 12/001 340/691.1 |
| 2014/0009671 A1* | 1/2014 | Ozone | H04N 5/2251 348/371 |

FOREIGN PATENT DOCUMENTS

| | | |
|---|---|---|
| JP | 2008-149602 A | 7/2008 |
| JP | 2009-222824 | 10/2009 |
| JP | 2009-246697 A | 10/2009 |
| JP | 2011-218672 A | 11/2011 |

OTHER PUBLICATIONS

Japanese Office Action mailed Mar. 29, 2016 in Japanese Patent Application No. 2012-031878.

* cited by examiner

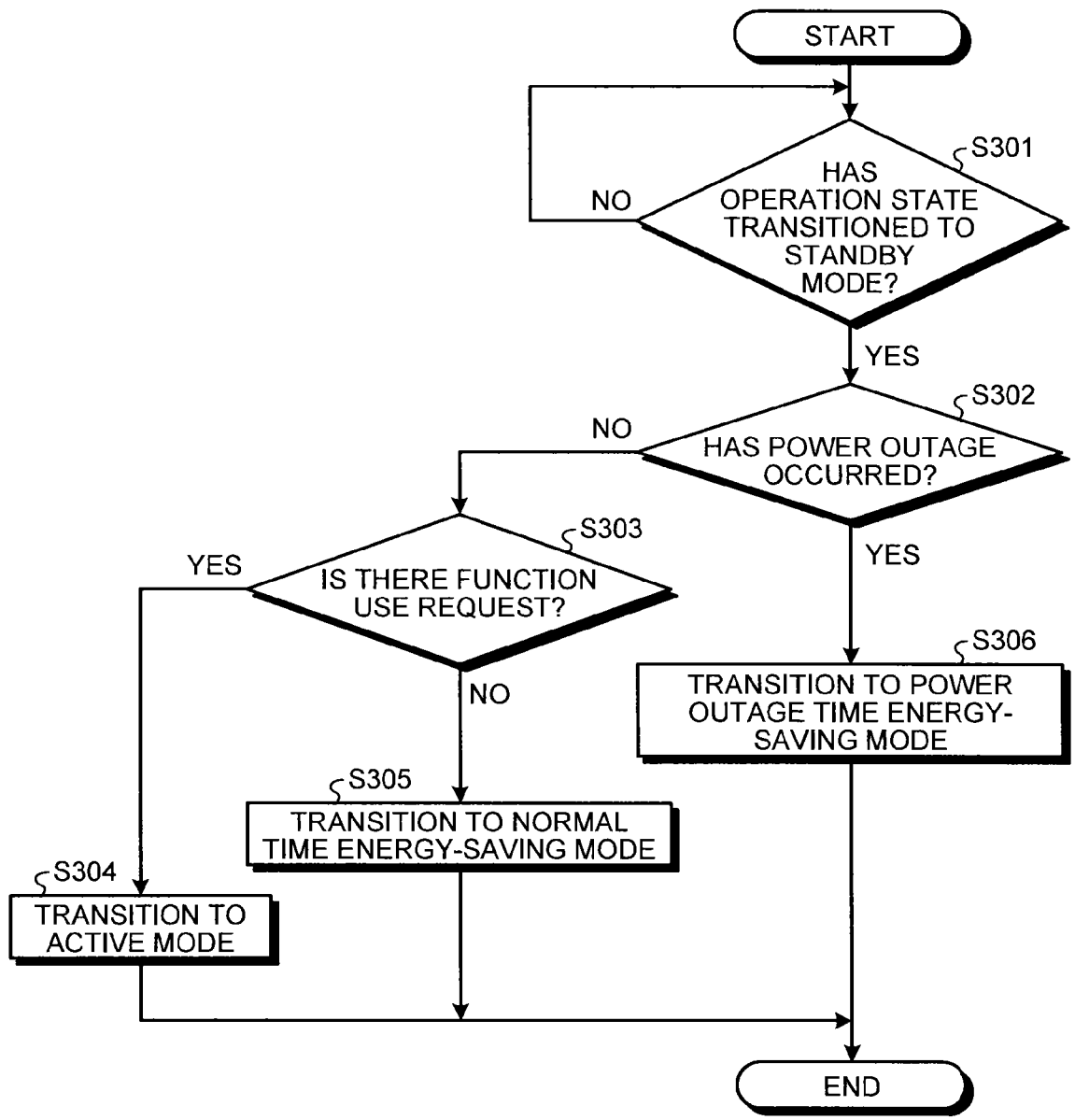

ELECTRONIC DEVICE, IMAGE PROCESSING APPARATUS, AND DEVICE CONTROL METHOD

CROSS-REFERENCE TO RELATED APPLICATION

The present application claims priority to and incorporates by reference the entire contents of Japanese Patent Application No. 2012-031878 filed in Japan on Feb. 16, 2012.

BACKGROUND OF THE INVENTION

1. Field of the Invention

The embodiment of the present invention relates to an electronic device, an image processing apparatus, and a device control method.

2. Description of the Related Art

Conventionally, there has been known an image processing apparatus such as a digital multi-function peripheral (MFP) having a printer function, a scanner function, a fax function, and a file server function.

Further, there has been conventionally known an image processing apparatus that has a normal mode as an operation state in which an image forming operation related to a printer function for forming an image on a recording sheet, an image reading operation related to a scanner function for reading an image on a document, and the like are being performed and an energy-saving mode as an operation state in which power consumption is reduced compared to the normal mode and a request for the use of the apparatus is awaited, wherein when the normal mode is switched to the energy-saving mode, supply of power from a commercial power supply as a main power supply is stopped and supply of power from a secondary battery as an auxiliary power supply is performed (see Japanese Patent Application Laid-open No. 2009-222824).

That is, in the image processing apparatus of Japanese Patent Application Laid-open No. 2009-222824, only when the normal mode is shifted to the energy-saving mode in which a user cannot use various functions such as a printer function and a scanner function, power is supplied from a secondary battery as an auxiliary power supply to respective function processing units which execute various functional operations such as a printer functional operation.

However, in a conventional image processing apparatus including the image processing apparatus of Japanese Unexamined Patent Application Publication No. 2009-222824, there is a problem in that when sudden cut-off of a main power supply such as power outage occurs, power cannot be supplied to respective function processing units which execute various functional operations regardless of mode types and all functions therefore cannot be used, thereby impairing convenience of a user.

Further, in a conventional image processing apparatus, there are problems in that, in a case where power outage occurs while data communication is being performed by a fax function, a file server function, and the like, data being transmitted is lost or there is caused a trouble in a storage unit such as memory and a hard disk inside the apparatus.

Further, in a conventional image processing apparatus, there is a problem in that, even if a commercially available uninterruptible power supply (UPS) having a small power supply capacity is connected thereto for supplying power during power outage, it is not possible to perform an image forming operation which consumes a large amount of power during power outage.

Therefore, there is a need for an electronic device, an image processing apparatus, and a device control method each of which makes it possible to execute a functional operation even in a sudden cut-off condition of a main power supply such as power outage, thereby improving convenience of a user, prevent occurrence of data loss or trouble of the apparatus in the cut-off condition, and execute a functional operation that consumes a large amount of power in the cut-off condition.

SUMMARY OF THE INVENTION

It is an object of the present invention to at least partially solve the problems in the conventional technology.

According to an embodiment, there is provided an electronic device that includes a detecting unit configured to detect cut-off of a main power supply; a power storage unit configured to store power; a sensing unit configured to sense an amount of remaining power of the power storage unit; a determining unit configured to determine whether a functional operation designated by a user is completed with the amount of remaining power sensed by the sensing unit in a cut-off condition of the main power supply detected by the detecting unit; and an operation control unit configured to control execution of the functional operation in the cut-off condition when the determining unit determines that the functional operation is completed with the amount of remaining power.

According to another embodiment, there is provided an image processing apparatus that includes a detecting unit configured to detect cut-off of a main power supply; a power storage unit configured to store power; a sensing unit configured to sense an amount of remaining power of the power storage unit; a determining unit configured to determine whether a functional operation designated by a user is completed with the amount of remaining power sensed by the sensing unit in a cut-off condition of the main power supply detected by the detecting unit; and an operation control unit configured to control execution of the functional operation in the cut-off condition when the determining unit determines that the functional operation is completed with the amount of remaining power.

According to still another embodiment, there is provided a device control method performed in an electronic device that includes a power storage unit configured to store power. The device control method includes detecting cut-off of a main power supply by a detecting unit; sensing an amount of remaining power of the power storage unit by a sensing unit; determining, by a determining unit, whether a functional operation designated by a user is completed with the amount of remaining power sensed by the sensing unit in a cut-off condition of the main power supply detected by the detecting unit; and controlling, by an operation control unit, execution of the functional operation in the cut-off condition when the determining unit determines that the functional operation is completed with the amount of remaining power.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a flow chart illustrating steps of a processing operation in the image processing apparatus of the present embodiment when a power outage condition occurs during a standby mode.

DETAILED DESCRIPTION OF THE PREFERRED EMBODIMENT

Hereinafter, an embodiment of the present invention will be described with reference to the appended drawings.

Although an electronic device, an image processing apparatus, and a device control method and program can be applied to various types of electronic devices such as a digital multi-function peripheral (MFP) having a plurality of functions such as a printer function, a scanner function, a fax function, and a file server function, hereinafter, a case where the present invention is applied to an image processing apparatus that is a digital MFP will be described.

First, a schematic hardware configuration of an image processing apparatus 1 of the present embodiment will be described with reference to FIG. 1.

Figure 1:
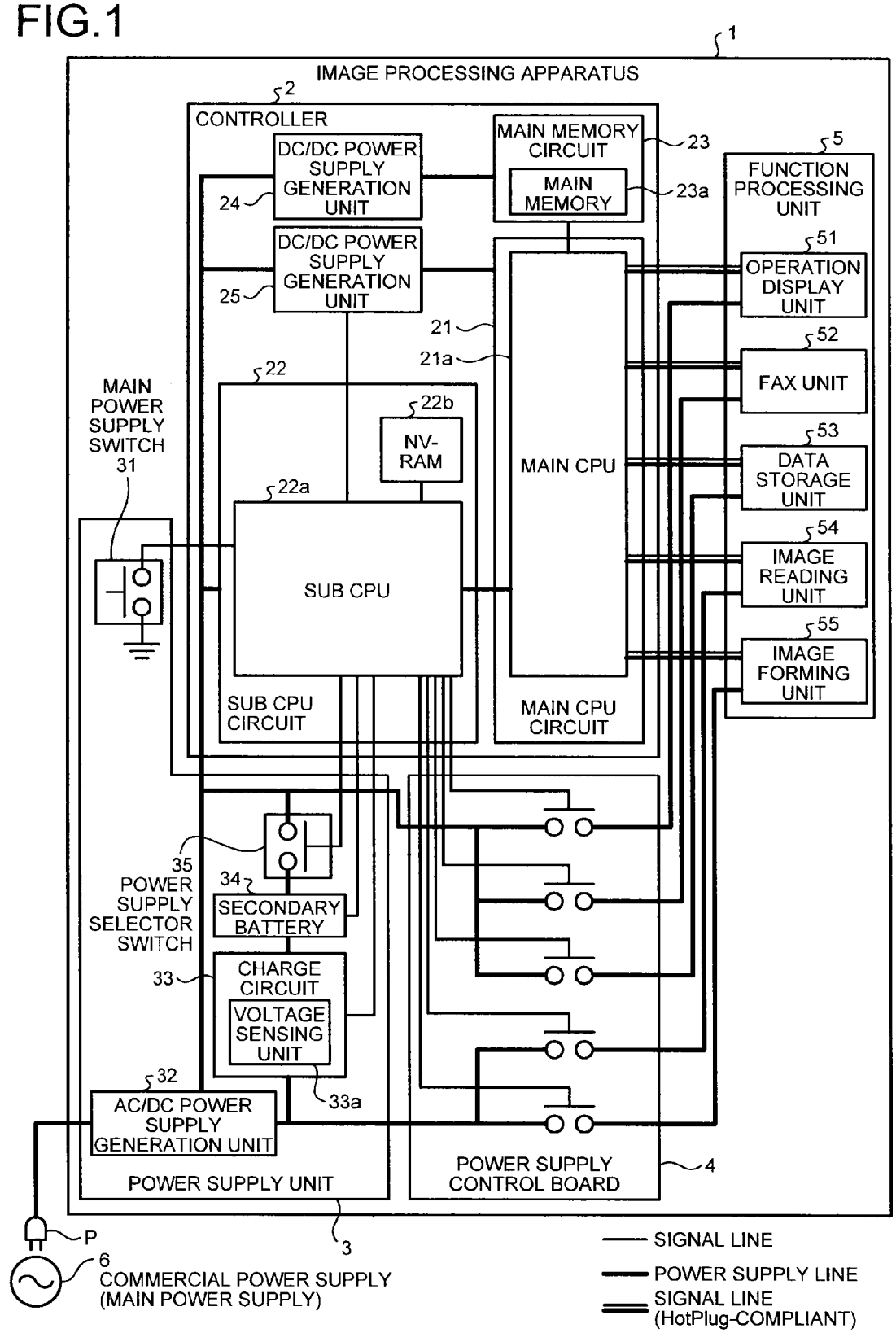
FIG. 1 is a block diagram illustrating a schematic hardware configuration of an image processing apparatus of the present embodiment.

As illustrated in FIG. 1, the image processing apparatus 1 of the present embodiment is mainly composed of a controller 2, a power supply unit 3, a power supply control board 4, and a function processing unit 5.

The controller 2 comprehensively controls the entire processing operation of the image processing apparatus 1. The controller 2 is composed of a main central processing unit (CPU) circuit 21 which is provided with a main CPU 21a, a sub CPU circuit 22 which is provided with a sub CPU 22a and a non-volatile random access memory (NVRAM) 22b, a main memory circuit 23 which is provided with a main memory 23a, a DC/DC power supply generation unit 24, and a DC/DC power supply generation unit 25.

The main CPU 21a controls a main process of the image processing apparatus 1. Specifically, the main CPU 21a deploys a system program stored in the main memory 23a in RAM (not illustrated) and the like and executes the system program to thereby activate the controller 2. Further, the main CPU 21a, in a later-described active mode M1 and a later-described standby mode M2 (see FIG. 2 for both of the modes), deploys an application program for executing a functional operation which is stored in the main memory 23a in RAM (not illustrated) and the like and executes the application program to thereby execute and control various functional operations using the function processing unit 5. Further, the main CPU 21a receives designation of a functional operation to be executed from a user through an operation display unit 51 or an external device (not illustrated) which is connected to a network (not illustrated) as with an executing functional operation receiving unit 226 which will be described later (see FIG. 3).

The sub CPU 22a controls a sub process of the image processing apparatus 1. Specifically, the sub CPU 22a, in a later-described limited mode M3 and a later-described energy-saving mode M4 (see FIG. 2 for both of the modes), deploys a program stored in the NVRAM 22b in RAM (not illustrated) and the like and executes the program to thereby execute and control a processing operation in the image processing apparatus 1 in place of the main CPU 21a when supply of power to the main CPU circuit 21 is cut off, namely, when the main CPU 21a is in an off state. Further, the sub CPU 22a controls on and off of an AC/DC power supply generation unit 32 and a power supply selector switch 35 depending on the state of the image processing apparatus 1.

The NVRAM 22b stores various data and programs used by the sub CPU 22a.

The main memory 23a is memory such as read only memory (ROM) and dynamic RAM (DRAM). The main memory 23a stores various data used by the main CPU 21a, a system program, application programs for executing and controlling functional operations related to various functions such as a fax communication function, a file server function, a scanner function, and a printer function.

The DC/DC power supply generation unit 24 generates DC voltage that is to be supplied to the main memory circuit 23. On the other hand, the DC/DC power supply generation unit 25 generates DC voltage that is to be supplied to the main CPU circuit 21 under the control of the sub CPU 22a.

Further, the power supply unit 3 generates DC voltage from AC voltage (power) supplied from a commercial power supply (main power supply) 6. Further, the power supply unit 3 switches supply and cut-off of power from the main power supply 6 to the AC/DC power supply generation unit 32 according to on and off of a main power supply switch 31 (a touch-tone switch), and also switches a power supply way with respect to respective load units under the control of the sub CPU 22a. Further, the power supply unit 3 of the present embodiment is provided with the main power supply switch 31, the AC/DC power supply generation unit 32, a charge circuit 33, a secondary battery 34, and the power supply selector switch 35.

The main power supply switch 31 is a switch for turning a power supply of the image processing apparatus 1 on and off, and used when the later-described standby mode M2 (see FIG. 2) is shifted to the later-described energy-saving mode M4 (see FIG. 2) or when the energy-saving mode M4 is shifted to the standby mode M2.

The AC/DC power supply generation unit 32 converts AC power to DC power, and generates DC voltage that is to be supplied to respective load units such as the controller 2 and the function processing unit 5 from AC voltage supplied from the main power supply 6.

The charge circuit 33 is a charge unit for charging the secondary battery 34 with power supplied from the main power supply 6. In the present embodiment, the charge circuit 33 is provided with a voltage sensing unit 33a as a unit for sensing the amount of remaining power of the secondary battery 34 and transferring information indicating the thus detected remaining power amount to the sub CPU 22a.

The secondary battery 34 is a power storage unit for storing power (charge). In the present embodiment, the secondary battery 34 has a large scale capacity that can supply power to load units for several hours in the later-described limited mode M3 and the later-described energy-saving mode M4 (see FIG. 2 for both of the modes).

The power supply selector switch 35 is a switch for switching a power supply path. Specifically, the power supply selector switch 35 is a switch for switching power that is to be supplied to respective load units such as the controller 2 and the function processing unit 5 to either power supplied from the main power supply 6 or power supplied from the secondary battery 34 under the control of the sub CPU 22a.

Further, the power supply control board 4 controls supply (energization) and cut-off of power with respect to the function processing unit 5 under the control of the sub CPU 22a. Specifically, the power supply control board 4 individually controls supply and cut-off of power to each of the operation display unit 51, a fax unit 52, a data storage unit 53, an image reading unit 54, and an image forming unit 55.

Further, the function processing unit 5 is a load unit which performs various functional operations such as a functional operation related to a user interface function and a functional operation related to image processing. The function processing unit 5 is provided with a plurality of function processing units such as the operation display unit 51, the fax (facsimile) unit 52, the data storage unit 53, the image reading unit 54, and the image forming unit 55.

The operation display unit (operation panel) 51 performs a functional operation related to a user interface function. Specifically, the operation display unit 51 is provided with a display unit 51a which is composed of a liquid crystal display and the like, the liquid crystal display having a touch panel laminated thereon for displaying various information to be notified to a user and receiving an operation input of a user and an operating unit 51b which is composed of a button key and the like for receiving an operation of a user (see FIG. 5 to FIG. 8 for both of the units 51a and 51b).

The fax unit 52 performs a functional operation related to a data communication function. Specifically, the fax unit 52 executes a fax communication functional operation related to transmission and reception of image data through a public network (not illustrated) (namely, fax communication).

The data storage unit 53 performs a functional operation related to a data storage function. Specifically, the data storage unit 53 executes a file server functional operation for transmitting and receiving data to and from an external device (not illustrated) such as a personal computer (PC) which is connected thereto through a network (not illustrated), and storing the data received from the external device in a storage unit such as a hard disk drive (HDD) and a solid state drive (SSD).

The image reading unit 54 performs a functional operation related to an image reading function. Specifically, the image reading unit 54 is a scanner which is provided with an image pickup device as a reading unit such as a charge coupled device (CCD). The image reading unit 54 executes a scanner functional operation for reading an image on a document set in an automatic document feeder (ADF) or an exposure glass using the reading unit.

The image forming unit 55 performs a functional operation related to an image forming function. Specifically, the image forming unit 55 is a printer which is provided with a monochrome plotter, a color plotter, an application specific integrated circuit (ASIC), a fixing device, and the like. The image forming unit 55 executes a printer functional operation for performing various image processing such as error diffusion and gamma conversion on image data representing the image read by the image reading unit 54 or image data received from the external device through the network, and then forming an image on a recording medium such as a recording sheet on the basis of the processed image data.

Further, in the image processing apparatus 1 of the present embodiment, by inserting an AC plug P into an outlet (not illustrated), the sub CPU 22a is activated. Then, by turning on the main power supply switch 31, the sub CPU 22a turns on each of the power supply generation units such as the AC/DC power supply generation unit 32, the DC/DC power supply generation unit 24, and the DC/DC power supply generation unit 25 to thereby activate the apparatus.

Next, various states that the image processing apparatus 1 of the present embodiment can take and state transition thereof will be described with reference to FIG. 2.

Figure 2:
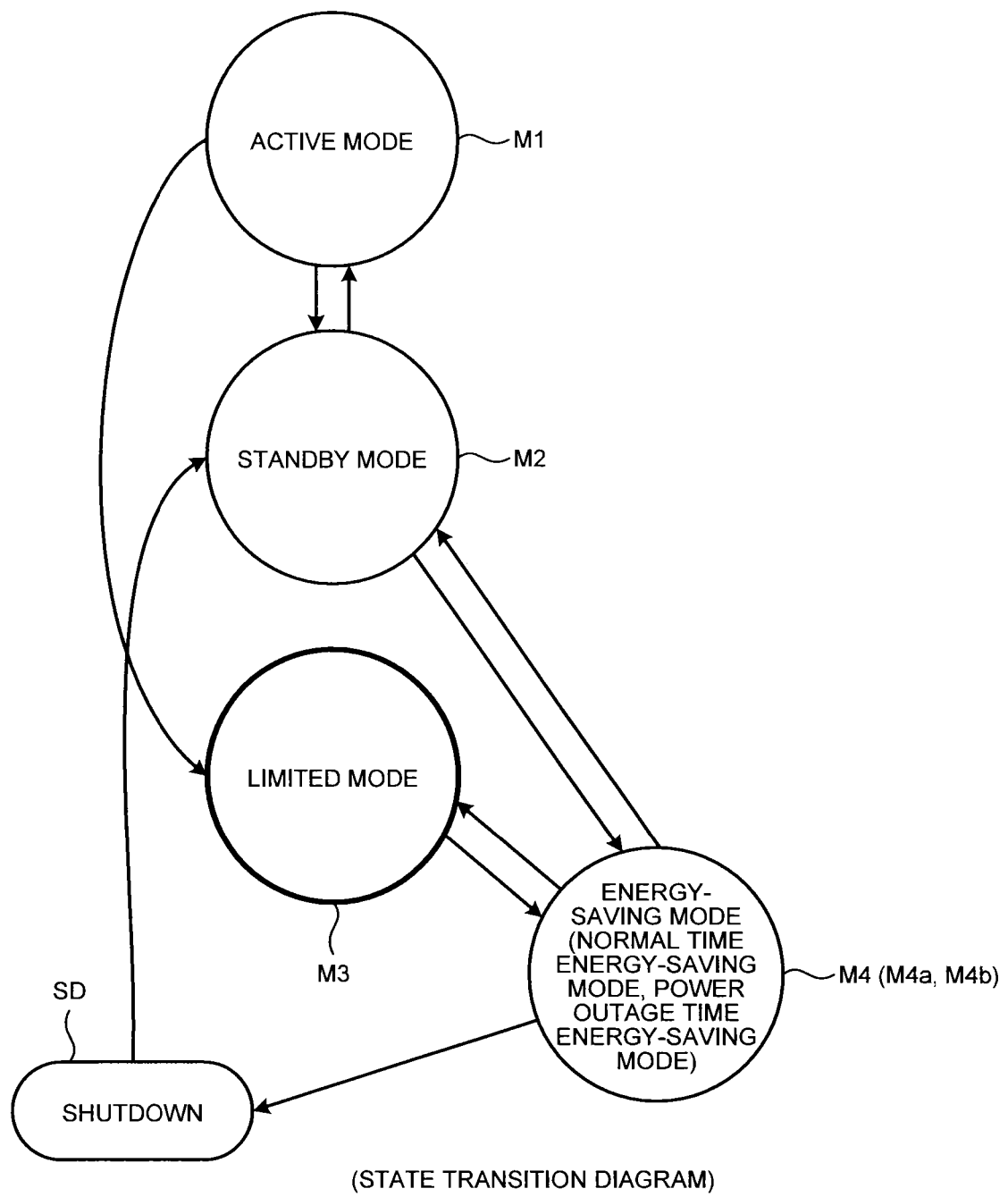
FIG. 2 is a schematic view illustrating various states that the image processing apparatus of the present embodiment can take and state transition thereof.

As illustrated in FIG. 2, the image processing apparatus 1 of the present embodiment can take four types of operation states including an active mode M1, a standby mode M2, a limited mode M3 and an energy-saving mode M4, and a state referred to as a shutdown SD in which a power supply of the apparatus is turned off.

The active mode M1 is an operation state in which various functional operations are performed using one or more units of the function processing unit 5 (such as the fax unit 52 and the image reading unit 54) in order to carry out a single job such as reading an image on a document and then faxing the read image to a destination device under the control of the main CPU 21a. Further, the active mode M1 is an operation state that consumes the largest amount of power among the four types of operation states.

Further, in the active mode M1, the image processing apparatus 1 of the present embodiment is activated in such a manner that the power supply selector switch 35 is turned off (the switch is opened) and the DC/DC power supply generation unit 25 is turned on (the switch is closed), and in addition to this, only a switch corresponding to a function processing unit to be used (the image forming unit 55, for example) is turned on (the switch is closed) and the other switches are turned off (the switches are opened) in the power supply control board 4 under the control of the sub CPU 22a, so that power is supplied from the main power supply 6 to the main CPU 21a, the sub CPU 22a, and the function processing unit to be used (the image forming unit 55, for example). Furthermore, the image processing apparatus 1 of the present embodiment transitions to the standby mode M2 when one or more functional operations responding to a request for the use of the function of the apparatus are completed in the active mode M1. Furthermore, the image processing apparatus 1 of the present embodiment transitions to the limited mode M3 when a sudden cut-off condition of the main power supply 6 caused by power outage and the like (hereinafter, may be just referred to as "a power outage condition") occurs during the active mode M1.

The standby mode M2 is an operation state in which the use of the function of the apparatus such as the scanner function and the printer function is awaited for a certain period of time under the control of the main CPU 21a. Further, the standby mode M2 is an operation state to which the image processing apparatus 1 transitions when the main power supply switch 31 is turned on in the state of the shutdown SD, or when a return factor is sensed in the energy-saving mode M4.

Further, in the standby mode M2, the image processing apparatus 1 of the present embodiment is activated in such a manner that the power supply selector switch 35 is turned off (the switch is opened), the DC/DC power supply generation unit 25 is turned on (the switch is closed), and all of the switches are turned off (the switches are opened) in the power supply control board 4 under the control of the sub CPU 22a, so that power is supplied from the main power supply 6 to the main CPU 21a and the sub CPU 22a. Furthermore, the image processing apparatus 1 of the present embodiment transitions to the active mode M1 when a request for the use of the function of the apparatus is generated and a functional operation using the function processing unit 5 is therefore going to be performed during the standby mode M2. Furthermore, the image processing apparatus 1 of the present embodiment transitions to a power outage time energy-saving mode M4b when a power outage condition occurs during the standby mode M2.

The limited mode M3 is an operation state in which, under the control of the sub CPU 22a which operates with power supplied from the secondary battery 34 in a power outage condition, there are performed a limited functional operation which can be operated with power (the amount of remaining power) of the secondary battery 34, a data storage operation, notification indicating that a requested operation is not available, and the like.

Further, in the limited mode M3, the image processing apparatus 1 of the present embodiment is activated in such a manner that the power supply selector switch 35 is turned on (the switch is closed) and the DC/DC power supply generation unit 25 is turned off (the switch is opened), and in addition to this, only a switch corresponding to a function processing unit to be used (the image forming unit 55, for example) is turned on (the switch is closed) and the other switches are turned off (the switches are opened) in the power supply control board 4 under the control of the sub CPU 22a, so that power is supplied from the secondary battery 34 to the sub CPU 22a and the function processing unit to be used (the image forming unit 55, for example). Furthermore, the image processing apparatus 1 of the present embodiment transitions to the power outage time energy-saving mode M4b, when, in the limited mode M3, a functional operation that has been in execution since before the transition to the limited mode M3 is completed, when the functional operation that has been in execution is stopped and storage of data related to the thus stopped functional operation is completed, when a functional operation that is requested by a user is completed, or when notification indicating that the requested operation is not available is performed without performing the requested functional operation.

The energy-saving mode (also referred to as a sleep mode) M4 is an operation state for reducing power consumption during a standby state in which there is no request for the use of the function. Also, the energy-saving mode M4 is an operation state in which there is monitored, under the control of the sub CPU 22a, generation of a return factor to return to the standby mode M2 such as reception of a job from an external device (not illustrated) which is connected thereto through a network (not illustrated) by a network response, sensing of a lifting operation of the ADF (not illustrated) to expose an exposure glass, sensing of an operation on the operation display unit 51, and sensing of expiration of a timer for a job reservation. Further, the energy-saving mode M4 is an operation state that consumes the smallest amount of power among the four types of operation states.

Further, the energy-saving mode M4 of the present embodiment includes a normal time energy-saving mode M4a and the power outage time energy-saving mode M4b.

Further, in the normal time energy-saving mode M4a, the image processing apparatus 1 of the present embodiment is activated in such a manner that the power supply selector switch 35 is turned off (the switch is opened), the DC/DC power supply generation unit 25 is turned off (the switch is opened), and all of the switches are turned off (the switches are opened) in the power supply control board 4 under the control of the sub CPU 22a, so that the main CPU 21a is turned off and the sub CPU 22a operates by the supply of power from the main power supply 6. Furthermore, the image processing apparatus 1 of the present embodiment transitions to the standby mode M2 when generation of the above-described return factor is sensed in the normal time energy-saving mode M4a.

Further, in the power outage time energy-saving mode M4b, the image processing apparatus 1 of the present embodiment is activated in such a manner that the power supply selector switch 35 is turned on (the switch is closed), the DC/DC power supply generation unit 25 is turned off (the switch is opened), and all of the switches are turned off (the switches are opened) in the power supply control board 4 under the control of the sub CPU 22a, so that the main CPU 21a is turned off and the sub CPU 22a operates by the supply of power from the secondary battery 34. Furthermore, the image processing apparatus 1 of the present embodiment transitions to the limited mode M3 when generation of the above-described return factor is sensed in the power outage time energy-saving mode M4b.

Further, the shutdown SD is a state in which the main power supply switch 31 is turned off and power supplied from the main power supply 6 to the AC/DC power supply generation unit 32 is thereby cut off, so that the entire apparatus is in an off state.

Next, a functional configuration of the image processing apparatus 1 of the present embodiment will be described with reference to FIG. 3.

Figure 3:
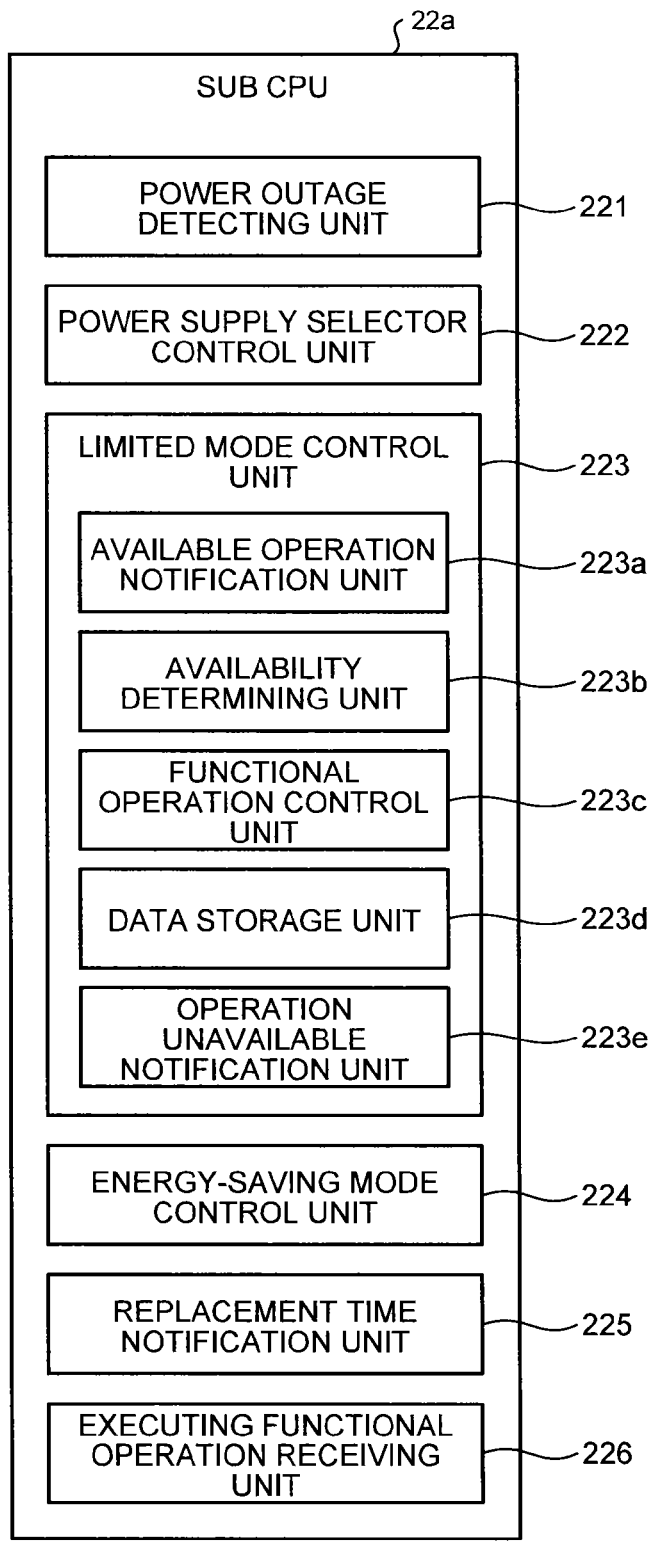
FIG. 3 is a block diagram illustrating a functional configuration of the image processing apparatus of the present embodiment.

As illustrated in FIG. 3, in the image processing apparatus 1, the sub CPU 22a serves as a power outage detecting unit 221, a power supply selector control unit 222, a limited mode control unit 223, an energy-saving mode control unit 224, a replacement time notification unit 225, and an executing functional operation receiving unit 226 by deploying a program stored in the NVRAM 22b and the like in RAM (not illustrated) and the like and executing the program.

The power outage detecting unit 221 detects a sudden cut-off condition of the main power supply 6 caused by power outage and the like (namely, a power outage condition). Specifically, the power outage detecting unit 221 detects a power outage condition by sensing that power flowing from the main power supply 6 to the charge circuit 33 has been cut off. Further, the power outage detecting unit 221 detects that the power outage condition is released and returned to a normal state by sensing that power has been supplied from the main power supply 6 to the charge circuit 33.

The power supply selector control unit 222 performs on (the switch is closed) and off (the switch is opened) of the power supply selector switch 35. Specifically, when the power outage detecting unit 221 detects a power outage condition in the active mode M1 or the normal time energy-saving mode M4a, the power supply selector control unit 222 turns on the power supply selector switch 35 (the switch is closed) to thereby switch the supply of power in the apparatus from the supply of power from the main power supply 6 to the supply of power from the secondary battery 34. Further, when the power outage detecting unit 221 detects that the power outage condition has been released and returned to a normal state in the power outage time energy-saving mode M4*b*, the power supply selector control unit 222 turns off the power supply selector switch 35 (the switch is opened) to thereby switch the supply of power in the apparatus from the supply of power from the secondary battery 34 to the supply of power from the main power supply 6.

The limited mode control unit 223 controls a processing operation related to the above-described limited mode M3. Specifically, when the power outage detecting unit 221 detects a power outage condition in the active mode M1 or when the energy-saving mode control unit 224 senses generation of a return factor in the power outage time energy-saving mode M4*b*, the limited mode control unit 223 causes the apparatus to transition to the limited mode M3 and controls a processing operation in the limited mode M3. Further, the limited mode control unit 223 includes an available operation notification unit 223*a*, an availability determining unit 223*b*, a functional operation control unit 223*c*, a data storage unit 223*d*, and an operation unavailable notification unit 223*e*.

When the image processing apparatus 1 has transitioned from the active mode M1 or the power outage time energy-saving mode M4*b* to the limited mode M3, the available operation notification unit 223*a* notifies a user of information indicating a functional operation that can be executed depending on the amount of remaining power of the secondary battery 34 at this point with display, sound, and the like.

More specifically, the available operation notification unit 223*a* obtains information indicating a standard power consumption amount consumed in respective functional operations from the NVRAM 22*b* and deploys the obtained information in RAM (not illustrated) and the like. Further, when the image processing apparatus 1 has transitioned to the limited mode M3, the available operation notification unit 223*a* identifies a functional operation that is available in the limited mode M3 from information indicating the amount of remaining power of the secondary battery 34, the information being obtained from the voltage sensing unit 33*a* of the charge circuit 33 (see FIG. 1), and the deployed information indicating the standard power consumption amount consumed in respective functional operations, and notifies a user of information indicating the thus identified functional operation.

Further, examples of the above-described standard power consumption amount consumed in respective functional operations, the standard power consumption amount being stored in the NVRAM 22*b*, include a power consumption amount consumed in an image forming operation (a printer functional operation) for forming a colored image on a single page of an A4-sized recording sheet, a power consumption amount consumed in an image reading operation (a scanner functional operation) for reading an image on a single page of a document, a power consumption amount consumed in a fax operation (a fax functional operation) for faxing image data representing an image on a single page of a document, and a power consumption amount consumed in a storage operation (a file server functional operation) for storing a file as image data representing an image on a single page of a document in a storage unit.

For example, in a case where the amount of remaining power of the secondary battery 34 when the image processing apparatus 1 has transitioned to the limited mode M3 is "10000 W", and the standard power consumption amount consumed in the image forming operation (the printer functional operation) for forming a colored image on a single page of an A4-sized recording sheet is "100 W", the available operation notification unit 223*a* identifies, when the image processing apparatus 1 has transitioned to the limited mode M3, "an image forming operation (the printer function) on 100 pages" as a functional operation that can be operated in the limited mode M3 from a value of "100" which is obtained by dividing the amount of remaining power of the secondary battery 34 of "10000 (W)" by the standard power consumption amount of "100 (W)".

Further, for example, in a case where the amount of remaining power of the secondary battery 34 when the image processing apparatus 1 has transitioned to the limited mode M3 is "90 W", and the standard power consumption amount consumed in the image forming operation (the printer functional operation) for forming a colored image on a single page of an A4-sized recording sheet is "100 W", the available operation notification unit 223*a* determines, when the image processing apparatus 1 has transitioned to the limited mode M3, that the printer functional operation cannot be executed in the limited mode M3 because a value of "0.9" which is obtained by dividing the remaining power amount of the secondary battery 34 of "90 (W)" by the standard power consumption amount of "100 (W)" is less than one.

Here, an example of a relationship between the amount of remaining power of the secondary battery 34 when the image processing apparatus 1 has transitioned to the limited mode M3 and a functional operation that can be executed depending on the amount of remaining power will be described with reference to FIG. 4.

Figure 4:
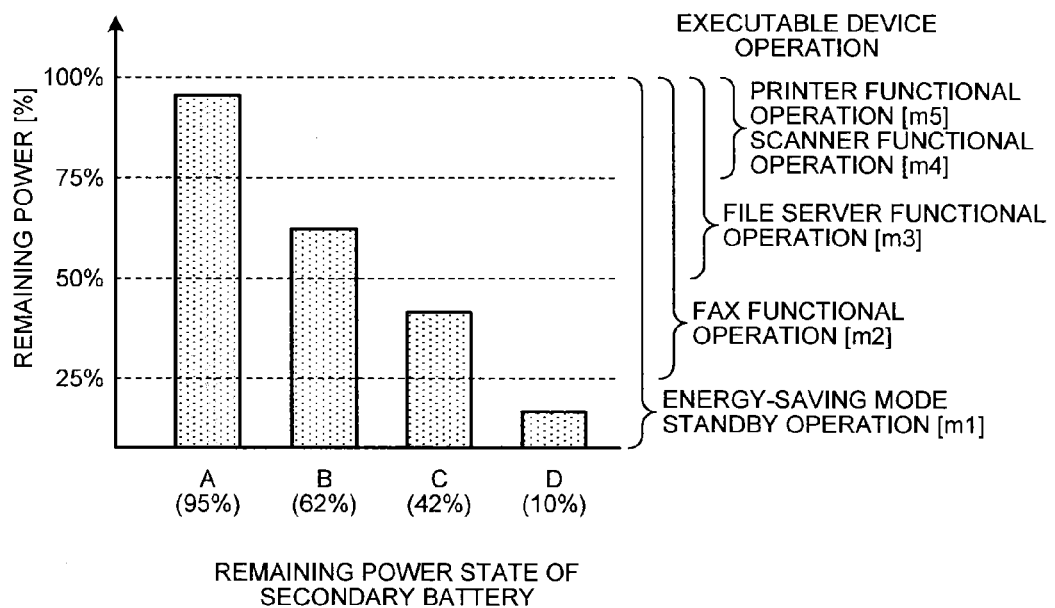
FIG. 4 is a graph illustrating an example of a relationship between an amount of remaining power of a secondary battery when the image processing apparatus has transitioned to a limited mode and a functional operation that can be executed depending on the amount of remaining power.

An example of FIG. 4 illustrates that, in a case where the amount of remaining power of the secondary battery 34 when the image processing apparatus 1 has transitioned to the limited mode M3 is in the state of A (95% of full charge), the image processing apparatus 1 of the present embodiment can execute an energy-saving mode standby operation [m1], a fax functional operation [m2], a file server functional operation [m3], a scanner functional operation [m4], and a printer functional operation [m5] in the limited mode M3.

Further, the example of FIG. 4 illustrates that, in a case where the amount of remaining power of the secondary battery 34 when the image processing apparatus 1 has transitioned to the limited mode M3 is in the state of B (62% of full charge), the image processing apparatus 1 of the present embodiment can execute the energy-saving mode standby operation [m1], the fax functional operation [m2], and the file server functional operation [m3] in the limited mode M3.

Further, the example of FIG. 4 illustrates that, in a case where the amount of remaining power of the secondary battery 34 when the image processing apparatus 1 has transitioned to the limited mode M3 is in the state of C (42% of full charge), the image processing apparatus 1 of the present embodiment can execute the energy-saving mode standby operation [m1] and the fax functional operation [m2] in the limited mode M3.

Further, the example of FIG. 4 illustrates that, in a case where the amount of remaining power of the secondary battery 34 when the image processing apparatus 1 has transitioned to the limited mode M3 is in the state of D (10% of full charge), the image processing apparatus 1 of the present embodiment can execute only the energy-saving mode standby operation [m1] in the limited mode M3.

Figure 5:
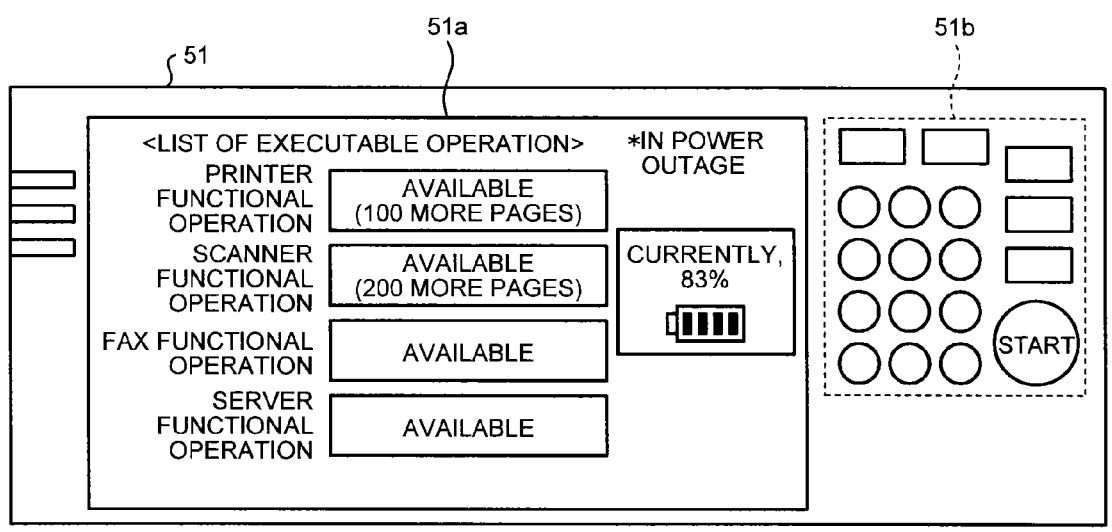
FIG. 5 is a schematic view illustrating an example of display of information indicating a functional operation that can be executed in the limited mode.
Figure 6:
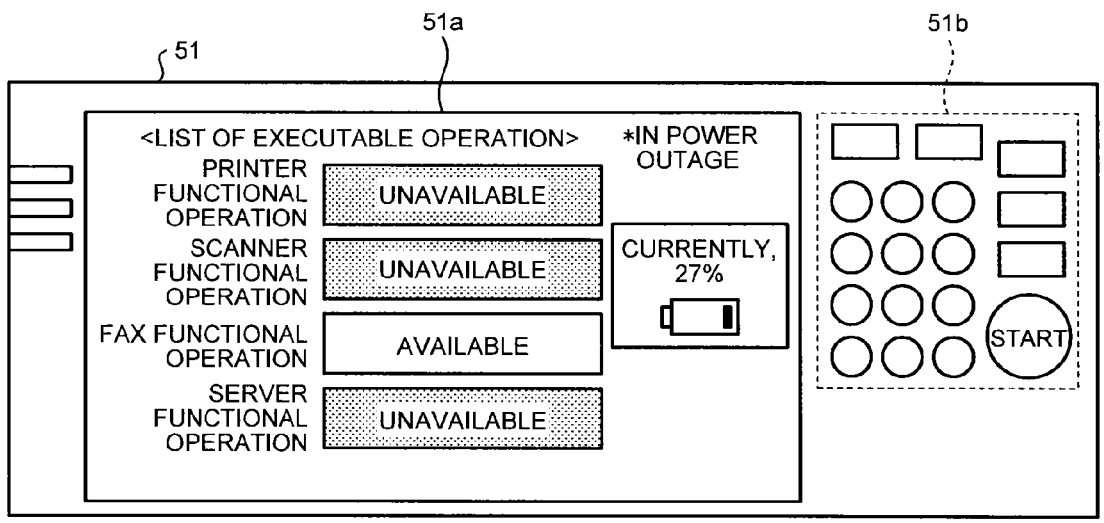
FIG. 6 is a schematic view illustrating an example of display of information indicating a functional operation that can be executed in the limited mode.

Further, the image processing apparatus 1 of the present embodiment is configured such that the available operation notification unit 223*a* notifies a user of information indicating a functional operation that can be executed in the limited mode M3 depending on the amount of remaining power of the secondary battery 34 using the display unit 51*a* of the operation display unit 51. FIG. 5 and FIG. 6 are schematic views each illustrating an example of display of information indicating a functional operation that can be executed in the limited mode M3.

An example of FIG. 5 illustrates that there are displayed, as information indicating an available functional operation in the limited mode M3, information such as "PRINTER FUNCTIONAL OPERATION: AVAILABLE (100 MORE PAGES)" which indicates that an image forming operation on 100 pages can be executed, information such as "SCANNER FUNCTIONAL OPERATION: AVAILABLE (200 MORE PAGES)" which indicates that an image reading operation on 200 pages of a document can be executed, information such as "FAX FUNCTIONAL OPERATION: AVAILABLE" which indicates that a fax functional operation can be executed, and information such as "SERVER FUNCTIONAL OPERATION: AVAILABLE" which indicates that a file server functional operation can be executed. That is, the example of FIG. 5 illustrates that all of the printer function, the scanner function, the fax function, and the file server function are available in the limited mode M3. Further, the example of FIG. 5 illustrates that there are displayed information such as "IN POWER OUTAGE" which indicates that the image processing apparatus 1 is in a power outage condition, and information such as "CURRENTLY, 83%" which indicates that the amount of remaining power of the secondary battery 34 when the image processing apparatus 1 has transitioned to the limited mode M3 is 83% of full charge.

On the other hand, an example of FIG. 6 illustrates that there are displayed information such as "PRINTER FUNCTIONAL OPERATION: UNAVAILABLE" which indicates that the printer functional operation cannot be executed, information such as "SCANNER FUNCTIONAL OPERATION: UNAVAILABLE" which indicates that the scanner functional operation cannot be executed, information such as "FAX FUNCTIONAL OPERATION: AVAILABLE" which indicates that the fax functional operation can be executed, and information such as "SERVER FUNCTIONAL OPERATION: UNAVAILABLE" which indicates that the file server functional operation cannot be executed. That is, the example of FIG. 6 illustrates that, in the limited mode M3, the printer function, the scanner function, and the file server function are not available, and only the fax function is available. Further, the example of FIG. 6 illustrates that there are displayed information such as "IN POWER OUTAGE" which indicates that the image processing apparatus 1 is in a power outage condition and information such as "CURRENTLY, 27%" which indicates that the amount of remaining power of the secondary battery 34 when the image processing apparatus 1 has transitioned to the limited mode M3 is 27% of full charge.

Referring back to FIG. 3, when the image processing apparatus 1 has transitioned from the active mode M1 to the limited mode M3, the availability determining unit 223b determines as to whether or not it is possible to normally complete a functional operation ("the printer functional operation", for example) that has been in execution since in the active mode M1 with the amount of remaining power of the secondary battery 34.

More specifically, the availability determining unit 223b determines as to whether or not it is possible to normally complete the above-described functional operation that has been received in the main CPU 21a and in execution since in the active mode M1 from information that is obtained from the voltage sensing unit 33a of the charge circuit 33 (see FIG. 1) and indicates the amount of remaining power of the secondary battery 34, information that is obtained from the NVRAM 22b and indicates the standard power consumption amount, and job information related to the above-described functional operation that has been in execution since in active mode M1 (information indicating the type of the function, the number of pages to be printed, and the like).

For example, in a case where the amount of remaining power of the secondary battery 34 when power outage has occurred during the active mode M1 in which a functional operation to execute a print job for forming colored images on 10 pages of A4-sized recording sheets is being performed (in this case, assuming that the image forming (printing) on five pages has been completed) and the image processing apparatus 1 has transitioned from the active mode M1 to the limited mode M3 is "10000 W", and the standard power consumption amount consumed in the image forming operation (the printer functional operation) for forming a colored image on a single page of an A4-sized recording sheet is "100 W", the availability determining unit 223b determines, when the image processing apparatus 1 has transitioned from the active mode M1 to the limited mode M3, that it is possible to normally complete the functional operation that has been in execution since in the active mode M1 with the amount of remaining power of the secondary battery 34 from a relationship of 5<100 which is a comparison between a value of "100" which is obtained by dividing the amount of remaining power of the secondary battery 34 of "10000 (W)" by the standard power consumption amount of "100 (W)" and a value of "10−5=5" which is the number of pages on which the image forming is not completed in the above-described print job.

Further, for example, in a case where the amount of remaining power of the secondary battery 34 when power outage has occurred during the active mode M1 in which a functional operation to execute a print job for forming colored images on 110 pages of A4-sized recording sheets is being performed (in this case, assuming that the image forming (printing) on five pages has been completed) and the image processing apparatus 1 has transitioned from the active mode M1 to the limited mode M3 is "10000 W", and the standard power consumption amount consumed in the image forming operation (the printer functional operation) for forming a colored image on a single page of an A4-sized recording sheet is "100 W", the availability determining unit 223b determines, when the image processing apparatus 1 has transitioned from the active mode M1 to the limited mode M3, that it is not possible to normally complete the functional operation that has been in execution since in the active mode M1 with the amount of remaining power of the secondary battery 34 from a relationship of 105>100 which is a comparison between a value of "100" which is obtained by dividing the amount of remaining power of the secondary battery 34 of "10000 (W)" by the standard power consumption amount of "100 (W)" and a value of "110−5=105" which is the number of pages on which the image forming is not completed in the above-described print job.

Further, the availability determining unit 223b determines as to whether or not it is possible to normally complete a functional operation that is requested by a user ("the printer functional operation", for example) with the amount of remaining power of the secondary battery 34 when the image processing apparatus 1 has transitioned from the power outage time energy-saving mode M4b to the limited mode M3.

More specifically, the availability determining unit 223b determines as to whether or not it is possible to normally complete the above-described functional operation that is requested by a user with the amount of remaining power of the secondary battery 34 from information that is obtained from the voltage sensing unit 33a of the charge circuit 33 (see FIG. 1) and indicates the amount of remaining power of the secondary battery 34, information that is obtained from the NVRAM 22b and indicates the standard power consumption amount, and job information related to the above-described functional operation that is requested by a user and received in the executing functional operation receiving unit 226.

For example, in a case where a functional operation that is requested by a user when the image processing apparatus 1 has transitioned from the power outage energy-saving mode M4b to the limited mode M3 is a functional operation to execute a print job for forming colored images on 10 pages of A4-sized recording sheets, the amount of remaining power of the secondary battery 34 when the image processing apparatus 1 has transitioned from the power outage energy-saving mode M4b to the limited mode M3 is "10000 W", and the standard power consumption amount consumed in the image forming operation (the printer functional operation) for forming a colored image on a single page of an A4-sized recording sheet is "100 W", the availability determining unit 223b determines, when the image processing apparatus 1 has transitioned from the power outage energy-saving mode M4b to the limited mode M3, that it is possible to normally complete the functional operation requested by the user ("the printer functional operation", for example) with the amount of remaining power of the secondary battery 34 from a relationship of 10<100 which is a comparison between a value of "100" which is obtained by dividing the amount of remaining power of the secondary battery 34 of "10000 (W)" by the standard power consumption amount of "100 (W)" and a value of "10" which is the number of pages on which the image forming is to be performed in the print job related to the above-described functional operation requested by a user.

Further, for example, in a case where a functional operation that is requested by a user when the image processing apparatus 1 has transitioned from the power outage energy-saving mode M4b to the limited mode M3 is a functional operation to execute a print job for forming colored images on 110 pages of A4-sized recording sheets, the amount of remaining power of the secondary battery 34 when the image processing apparatus 1 has transitioned from the power outage energy-saving mode M4b to the limited mode M3 is "10000 W", and the standard power consumption amount consumed in the image forming operation (the printer functional operation) for forming a colored image on a single page of an A4-sized recording sheet is "100 W", the availability determining unit 223b determines, when the image processing apparatus 1 has transitioned from the power outage energy-saving mode M4b to the limited mode M3, that it is not possible to normally complete the functional operation requested by the user ("the printer functional operation", for example) with the amount of remaining power of the secondary battery 34 from a relationship of 110>100 which is a comparison between a value of "100" which is obtained by dividing the amount of remaining power of the secondary battery 34 of "10000 (W)" by the standard power consumption amount of "100 (W)" and a value of "110" which is the number of pages on which the image forming is to be performed in the print job related to the above-described functional operation requested by a user.

When the availability determining unit 223b determines that it is possible to normally complete a functional operation that has been in execution since in the active mode M1 ("the fax functional operation", for example) with the amount of remaining power of the secondary battery 34, the functional operation control unit 223c controls a functional operation of a unit of the function processing unit 5 ("the fax unit", for example) in order to continuously execute, in the limited mode M3, the above-described functional operation that has been in execution since in the active mode M1. Further, when the availability determining unit 223b determines that it is possible to normally complete a functional operation that is requested by a user ("the fax functional operation", for example) with the amount of remaining power of the secondary battery 34, the functional operation control unit 223c controls a functional operation of a unit of the function processing unit 5 ("the fax unit", for example) in order to execute the above-described functional operation that is requested by the user.

When the availability determining unit 223b determines that it is not possible to normally complete a functional operation that has been in execution since in the active mode M1 ("the fax functional operation", for example) with the amount of remaining power of the secondary battery 34, the data storage unit 223d performs control so as to stop the above-described functional operation that has been in execution since in the active mode M1 and performs a process for storing data related to this functional operation (such as image data that is to be faxed by the fax function, file data that is to be stored in a storage unit by the file server function, and image data representing an image that is to be formed on a recording sheet by the printer function) in a predetermined storage unit. Further, the data storage unit 223d notifies a user of information indicating that the data storage has been performed (such as "PRINT DATA HAS BEEN STORED.") with sound, display, and the like.

When the availability determining unit 223b determines that it is not possible to normally complete a functional operation that is requested by a user ("the fax functional operation", for example) with the amount of remaining power of the secondary battery 34, the operation unavailable notification unit 223e notifies the user of information indicating that the above-described functional operation requested by the user is unavailable with display, sound, and the like.

Figure 7:
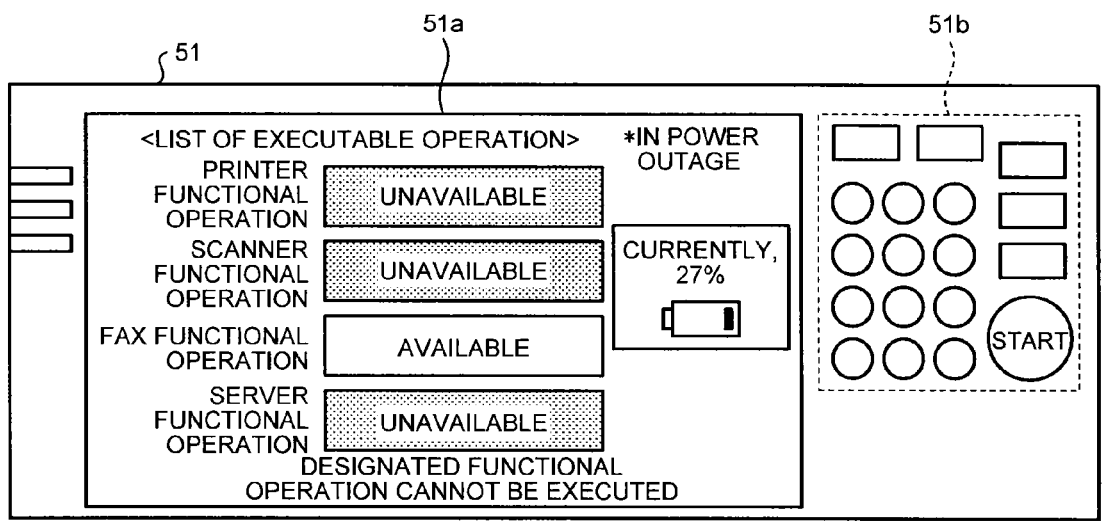
FIG. 7 is a schematic view illustrating an example of display of information indicating that a functional operation that is requested cannot be executed.

Further, the image processing apparatus 1 of the present embodiment is configured such that the operation unavailable notification unit 223e notifies a user of information indicating that the requested functional operation is unavailable using the display unit 51a of the operation display unit 51. FIG. 7 is a schematic view illustrating an example of display of information indicating that a functional operation that is requested is unavailable. An example of FIG. 7 illustrates that there is displayed information such as "DESIGNATED FUNCTIONAL OPERATION CANNOT BE EXECUTED." as information indicating that the requested functional operation is unavailable.

Referring back to FIG. 3, the energy-saving mode control unit 224 controls a processing operation in the energy-saving mode M4. Specifically, when the image processing apparatus 1 has transitioned from the active mode M1 to the limited mode M3, and a functional operation that has been in execution since in the active mode M1 is normally completed or a storage operation of data related to the functional operation is normally completed in the limited mode M3, the energy-saving mode control unit 224 causes the apparatus to transition to the power outage time energy-saving mode M4b. Further, when the power outage detecting unit 221 detects a power outage condition in the normal time energy-saving mode M4a, the energy-saving mode control unit 224 causes the apparatus to transition to the power outage time energy-saving mode M4b. Further, when the power outage detecting unit 221 detects that the power outage condition has been released and returned to a normal state in the power outage time energy-saving mode M4b, the energy-saving mode control unit 224 causes the apparatus to transition to the normal time energy-saving mode M4a.

The replacement time notification unit 225 notifies a user of time for replacement of the secondary battery 34. Specifically, the replacement time notification unit 225 counts the number of times the main power supply 6 is cut off due to power outage and stores the counted number in the NVRAM 22b and the like. Further, when the number of cut-off times exceeds a predetermined number, the replacement time notification unit 225 notifies a user of information urging replacement of the secondary battery 34 with display, sound, and the like. Such a configuration makes it possible to urge a user to replace the secondary battery 34 when the number of charging and discharging times of the secondary battery 34 (namely, the number of times corresponding to the number of cut-off times) has exceeded or is about to exceed a predetermined number of times that is the life of the secondary battery 34.

Figure 8:
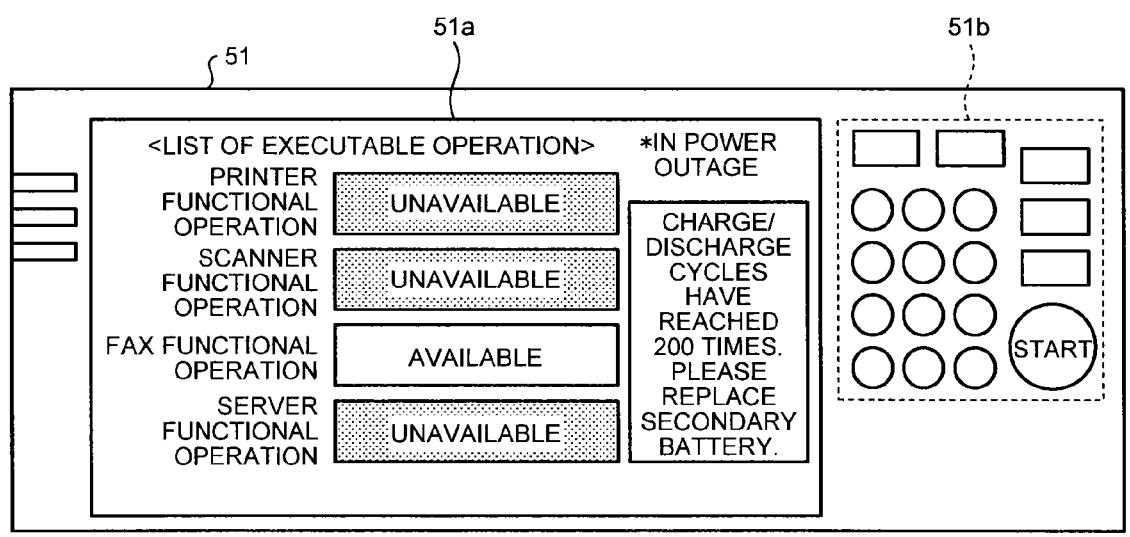
FIG. 8 is a schematic view illustrating an example of display of information urging replacement of the secondary battery.

Further, the image processing apparatus 1 of the present embodiment is configured such that the replacement time notification unit 225 notifies a user of information urging replacement of the secondary battery 34 using the display unit 51a of the operation display unit 51. FIG. 8 is a schematic view illustrating an example of display of information urging replacement of the secondary battery 34. An example of FIG. 8 illustrates that there is displayed information such as "CHARGE/DISCHARGE CYCLES HAVE REACHED 200 TIMES. PLEASE REPLACE SECONDARY BATTERY." as information urging replacement of the secondary battery 34.

Referring back to FIG. 3, the executing functional operation receiving unit 226 receives designation of a functional operation to be executed (such as a functional operation to execute a print job for forming colored images on 10 pages of A4-sized recording sheets and a functional operation to execute facsimile transmission) from a user through the operation display unit 51 or an external device (not illustrated) which is connected to a network (not illustrated).

Next, processing operations of the image processing apparatus 1 of the present embodiment will be described with reference to FIG. 9 to FIG. 11.

First, steps of a processing operation in the image processing apparatus 1 in a case where a power outage condition has occurred during the active mode M1 will be described with reference to a flow chart of FIG. 9.

Figure 9:
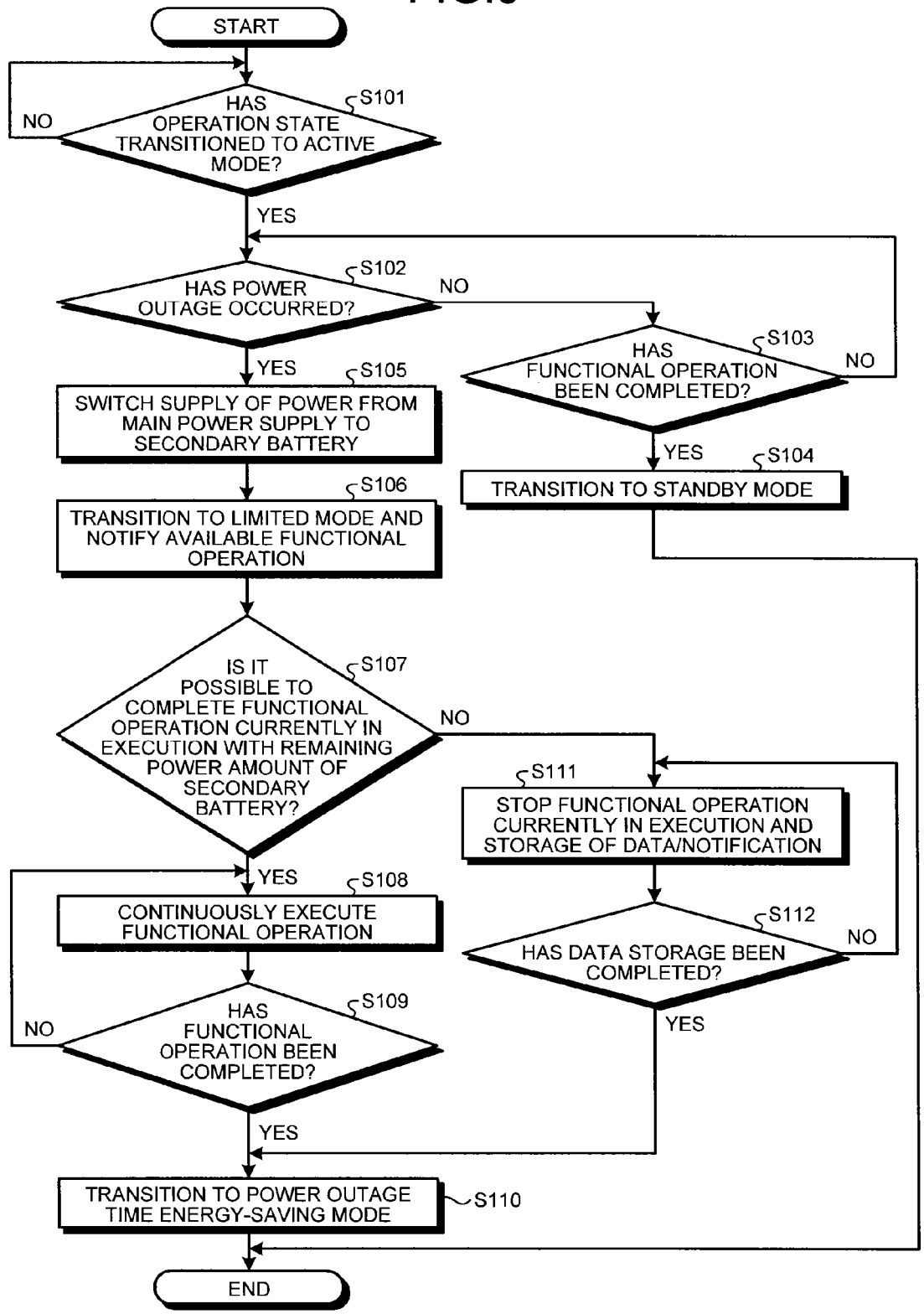
FIG. 9 is a flow chart illustrating steps of a processing operation in the image processing apparatus of the present embodiment when a power outage condition occurs during an active mode.

As illustrated in FIG. 9, in the image processing apparatus 1, when the operation state of the apparatus has transitioned to the active mode M1 in order to execute a job such as a job for reading an image on a document and faxing the read image to a destination device (YES in step S101), the main CPU 21a determines as to whether or not a power outage condition has occurred in step S102 and determines as to whether or not a functional operation that has been in execution in the active mode M1 is completed in step S103. Then, in these determinations, when it is determined that a power outage condition has not occurred in the active mode M1 (NO in step S102) and the functional operation has been completed (YES in step S103), the image processing apparatus 1 causes the operation state of the apparatus to transition to the standby mode M2 (step S104) and finishes the process in this case.

On the other hand, when the power outage detecting unit 221 detects a power outage condition (YES in step S102) during the active mode M1 (YES in step S101), the power supply selector control unit 222 turns on the power supply selector switch 35 (the switch is closed) to thereby switch the supply of power in the apparatus from the supply of power from the main power supply 6 to the supply of power from the secondary battery 34 (step S105).

Then, the limited mode control unit 223 operates to cause the apparatus to transition to the limited mode M3. Further, the available operation notification unit 223a identifies a functional operation that can be executed depending on the amount of remaining power of the secondary battery 34 at this point and displays information indicating the thus identified functional operation on the display unit 51a of the operation display unit 51 (step S106).

Then, the availability determining unit 223b determines as to whether or not, when the image processing apparatus 1 has transitioned from the active mode M1 to the limited mode M3, it is possible to normally complete a functional operation that has been in execution since in the active mode M1 (such as "the fax functional operation" and "the printer functional operation") with the amount of remaining power of the secondary battery 34 (step S107).

When the availability determining unit 223b determines, in the determination, that the normal completion is possible (YES in step S107), in order to continuously execute, in the limited mode M3, the above-described one or more functional operations that have been in execution since in the active mode M1, the functional operation control unit 223c then executes and controls one or more functional operations of the function processing unit 5 (such as the fax unit 52 and the image reading unit 54) corresponding to the above-described one or more functional operations, and also performs off-control of the switches of the power supply control board 4 in order to cut off the supply of power to a unit of the function processing unit 5, the unit being no longer necessary to be used (such as the image reading unit 54) each time (step S108).

Now, an example of a specific process of step S108 will be described.

There will be described a process of step S108, for example, in a case where a user sets a plurality of sheets of a document on an ADF (not illustrated), and then designates a fax destination and gives an instruction to start fax transmission on the operation display unit 51, so that the image processing apparatus 1 transitions to the active mode M1 before a power outage condition is detected (YES in step S101), and also in a case where a power outage condition is detected while the image processing apparatus 1 executes the scanner functional operation for reading images on the document using the image reading unit 54 and, at the same time, sequentially faxes the read images of the document using the fax unit 52 (YES in step S102).

In this case, in step S108, the functional operation control unit 223c controls functional operations of the fax unit 52 and the image reading unit 54. Further, when the reading of all sheets of the document has been completed, the functional operation control unit 223c controls a switch of the power supply control board 4, the switch connecting a path for supplying power from the secondary battery 34 to the image reading unit 54, so as to be turned off (the switch is opened) in order to cut off the supply of power to the image reading unit 54. Further, when the fax transmission of all of the image data has been completed, the functional operation control unit 223c controls a switch of the power supply control board 4, the switch connecting a path for supplying power from the secondary battery 34 to the fax unit 52, so as to be turned off (the switch is opened) in order to cut off the supply of power to the fax unit 52.

Further, as another specific example, there will be described a process of step S108, for example, in a case where a user sets a plurality of sheets of a document on an ADF (not illustrated), and then gives an instruction to start copying on the operation display unit 51, so that the image processing apparatus 1 transitions to the active mode M1 before a power outage condition is detected (YES in step S101), and also in a case where a power outage condition is detected while the image processing apparatus 1 executes the scanner functional operation for reading images on the document using the image reading unit 54 and, at the same time, sequentially forms the read images of the document on recording sheets using the image forming unit 55 (YES in step S102).

In this case, in step S108, the functional operation control unit 223c controls functional operations of the image reading unit 54 and the image forming unit 55. Further, when the reading of all sheets of the document has been completed, the functional operation control unit 223c controls a switch of the power supply control board 4, the switch connecting a path for supplying power from the secondary battery 34 to the image reading unit 54, so as to be turned off (the switch is opened) in order to cut off the supply of power to the image reading unit 54. Further, when the image formation for all of the read images has been completed, the functional operation control unit 223c controls a switch of the power supply control board 4, the switch connecting a path for supplying power from the secondary battery 34 to the image forming unit 55, so as to be turned off (the switch is opened) in order to cut off the supply of power to the image forming unit 55.

Then, when all of the functional operations for the job have been normally completed (YES in step S109), in the image processing apparatus 1, the energy-saving mode control unit 224 operates to cause the apparatus to transition to the power outage time energy-saving mode M4b (step S110). After that, the image processing apparatus 1 finishes the process in this case.

On the other hand, when the availability determining unit 223b determines, in the determination in step S107, that the normal completion is not possible (NO in step S107), the data storage unit 223d then performs control to stop the above-described functional operation that has been in execution since in the active mode M1 (such as "the printer functional operation"), and performs a process for storing data related to this functional operation (such as image data representing an image that is to be formed on a recording sheet by the printer function) in a predetermined storage unit (step S111).

Now, an example of a specific process of step S111 will be described.

There will be described a process of the step S111, for example, in a case where a user sets a plurality of sheets of a document on an ADF (not illustrated) and then gives an instruction to start copying on the operation display unit 51, so that the image processing apparatus 1 transitions to the active mode M1 before a power outage condition is detected (YES in step S101), and also in a case where a power outage condition is detected while the image processing apparatus 1 executes the scanner functional operation for reading images on the document using the image reading unit 54 and, at the same time, sequentially forms the read images of the document on recording sheets using the image forming unit 55 (YES in step S102).

In this case, in step S111, the functional operation control unit 223c performs stop-control of functional operations of the image reading unit 54 and the image forming unit 55. In addition, the functional operation control unit 223c controls switches of the power supply control board 4, each of the switches connecting a path for supplying power from the secondary battery 34 to each of the image reading unit 54 and the image forming unit 55, so as to be turned off (the switches are opened) in order to cut off the supply of power to the image reading unit 54 and the image forming unit 55. Further, the functional operation control unit 223c performs control to store all of the image data read from the document or some of the image data that have not yet been formed on the recording sheets in a predetermined storage unit.

Then, when the storage of the data has been normally completed (YES in step S112), the image processing apparatus 1 shifts the process to the above-described step S110 and then performs the same process thereafter as described above.

Next, steps of a processing operation in the image processing apparatus 1 in a case where a power outage condition has occurred during the energy-saving mode M4 will be described with reference to a flow chart of FIG. 10.

Figure 10:
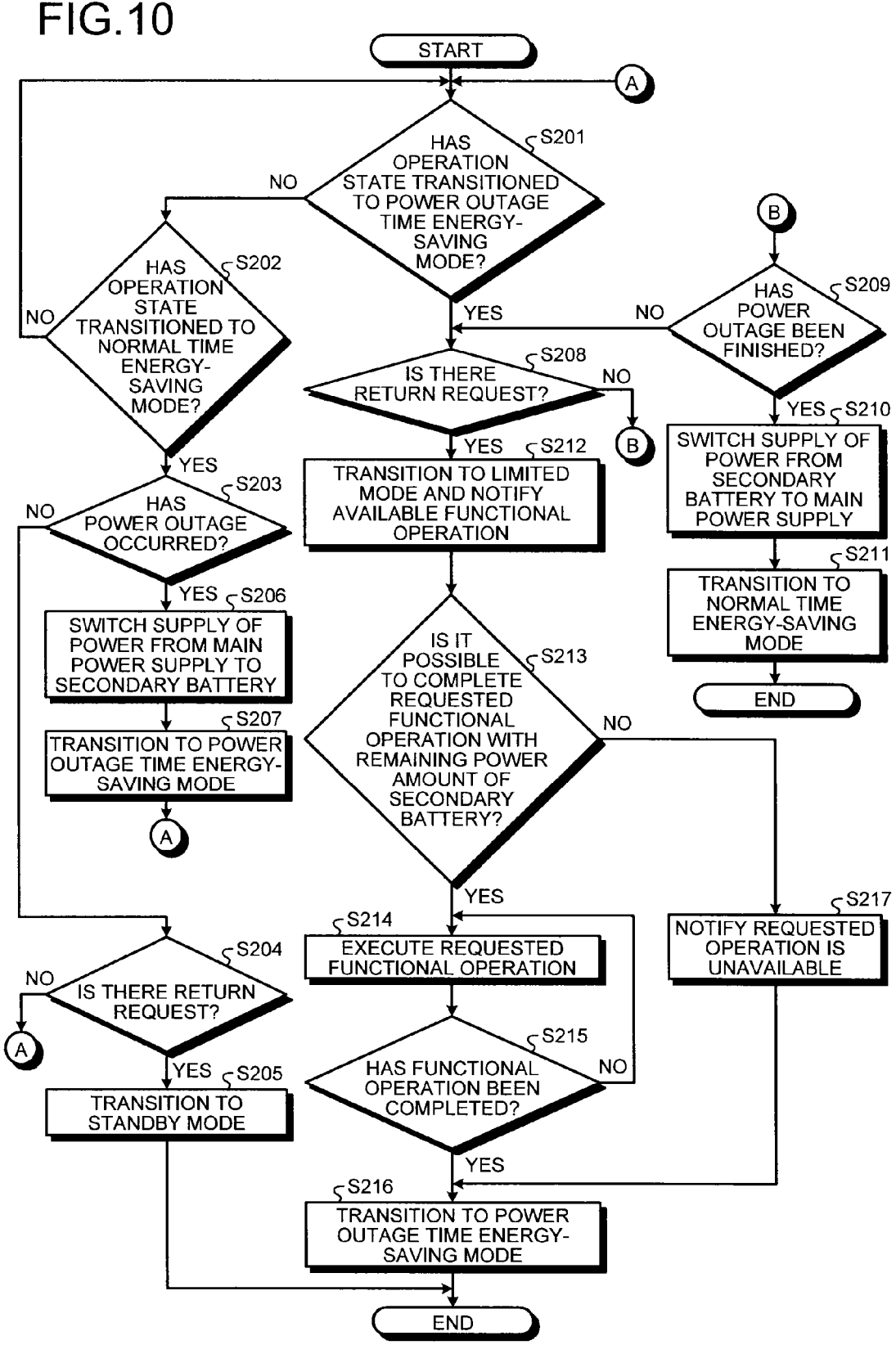
FIG. 10 is a flow chart illustrating steps of a processing operation in the image processing apparatus of the present embodiment when a power outage condition occurs during an energy-saving mode.

As illustrated in FIG. 10, in the image processing apparatus 1, when the operation state of the apparatus has transitioned to the normal time energy-saving mode M4a (YES in step S202), it is then determined as to whether or not a power outage condition has occurred in step S203 and determines as to whether or not a return request has been generated in step S204. Further, when it is determined, in these determinations, that a power outage condition has not occurred during the normal time energy-saving mode M4a (NO in step S203) and the return request has been generated (YES in step S204), the image processing apparatus 1 causes the operation state of the apparatus to transition to the standby mode M2 (step S205) and finishes the process in this case.

On the other hand, when the power outage detecting unit 221 detects a power outage condition (YES in step S203) during the normal time energy-saving mode M4a (YES in step S202), the power supply selector control unit 222 turns on the power supply selector switch 35 (the switch is closed) to thereby switch the supply of power in the apparatus from the supply of power from the main power supply 6 to the supply of power from the secondary battery 34 (step S206). Then, the energy-saving mode control unit 224 causes the apparatus to transition to the power outage time energy-saving mode M4b (step S207).

Further, in the image processing apparatus 1, when the operation state of the apparatus has transitioned to the power outage time energy-saving mode M4b (YES in step S201), it is determined as to whether or not a return request has been generated in step S208 and as to whether or not a power outage condition has been released and returned to a normal state in step S209.

Then, in these determinations, when a return request has not been generated during the power outage time energy-saving mode M4b (NO in step S208) and the power outage detecting unit 221 detects that the power outage condition has been released and returned to a normal state (YES in step S209), the power supply selector control unit 222 then turns off the power supply selector switch 35 (the switch is opened) to thereby switch the supply of power in the apparatus from the supply of power from the secondary battery 34 to the supply of power from the main power supply 6 (step S210). Then, the energy-saving mode control unit 224 causes the apparatus to transition to the normal time energy-saving mode M4a (step S211).

On the other hand, when it is determined, in the determinations in step S208 and step S209, that a return request has been generated during the power outage energy-saving mode M4b (YES in step S208), the limited mode control unit 223 operates to cause the apparatus to transition to the limited mode M3. Further, the available operation notification unit 223a identifies a functional operation that can be executed depending on the amount of remaining power of the secondary battery 34 at this point and displays information indicating the thus identified functional operation on the display unit 51a of the operation display unit 51 (step S212).

Then, the availability determining unit 223b determines as to whether or not it is possible to normally complete a functional operation that is requested by a user, the functional operation responding to the above-described return request (such as "the fax functional operation" and "the printer functional operation"), with the amount of remaining power of the secondary battery 34 (step S213).

When the availability determining unit 223b determines, in the determination, that the normal completion is possible (YES in step S213), the functional operation control unit 223c then executes and controls a functional operation of a unit of the function processing unit 5 (such as the fax unit 52 and the image reading unit 54) corresponding to the above-described functional operation requested by a user, and also performs off-control of the switches of the power supply control board 4 in order to cut off the supply of power to a unit of the function processing unit 5, the unit being no longer necessary to be used (such as the image reading unit 54) each time (step S214).

Now, an example of a specific process of step S214 will be described.

There will be described a process of step S214, for example, in a case where a user sets a plurality of sheets of a document on an ADF (not illustrated), and designates a fax destination and gives an instruction to start fax transmission on the operation display unit 51, so that the image processing apparatus 1 detects generation of a return request (YES in step S208), and also in a case where the image processing apparatus 1 determines, in step S213, that it is possible to complete the requested functional operation with the amount of remaining power of the secondary battery 34 (YES in step S213).

In this case, in step S214, the functional operation control unit 223c controls switches of the power supply control board 4, each of the switches connecting a path for supplying power from the secondary battery 34 to each of the fax unit 52 and the image reading unit 54, so as to be turned on (the switches are closed) in order to supply power from the secondary battery 34 to the fax unit 52 and the image reading unit 54. Further, when the image reading of all sheets of the document has been completed, the functional operation control unit 223c controls a switch of the power supply control board 4, the switch connecting a path for supplying power from the secondary battery 34 to the image reading unit 54, so as to be turned off (the switch is opened) in order to cut off the supply of power to the image reading unit 54. Further, when the fax transmission has been completed, the functional operation control unit 223c controls a switch of the power supply control board 4, the switch connecting a path for supplying power from the secondary battery 34 to the fax unit 52, so as to be turned off (the switch is opened) in order to cut off the supply of power to the fax unit 52.

Further, as another specific example, there will be described a process of step S114, for example, in a case where a user sets a plurality of sheets of a document on an ADF (not illustrated), and gives an instruction to start copying on the operation display unit 51, so that the image processing apparatus 1 detects generation of a return request (YES in step S208), and also in a case where the image processing apparatus 1 determines, in step S213, that it is possible to complete the requested functional operation with the amount of remaining power of the secondary battery 34 (YES in step S213).

In this case, in step S214, the functional operation control unit 223c controls switches of the power supply control board 4, each of the switches connecting a path for supplying power from the secondary battery 34 to each of the image reading unit 54 and the image forming unit 55, so as to be turned on (the switches are closed) in order to supply power from the secondary battery 34 to the image reading unit 54 and the image forming unit 55. Further, when the image reading of all sheets of the document has been completed, the functional operation control unit 223c controls a switch of the power supply control board 4, the switch connecting a path for supplying power from the secondary battery 34 to the image reading unit 54, so as to be turned off (the switch is opened) in order to cut off the supply of power to the image reading unit 54. Further, when the image formation for all of the read images has been completed, the functional operation control unit 223c controls a switch of the power supply control board 4, the switch connecting a path for supplying power from the secondary battery 34 to the image forming unit 55, so as to be turned off (the switch is opened) in order to cut off the supply of power to the image forming unit 55.

Then, when all of the requested functional operations have been normally completed (YES in step S215), the energy-saving mode control unit 224 operates to cause the apparatus to transition to the power outage time energy-saving mode M4b (step S216). After that, the image processing apparatus 1 finishes the process in this case.

On the other hand, when the availability determining unit 223b determines, in the determination in the step S213, that the completion is not possible (NO in step S213), the operation unavailable notification unit 223e then displays information indicating that the above-described functional operation requested by a user is unavailable (see FIG. 7) on the display unit 51a of the operation display unit 51 (step S217). The, the image processing apparatus 1 shifts the process to step S216 and then performs the same process thereafter as described above.

Next, steps of a processing operation in the image processing apparatus 1 in a case where a power outage condition has occurred during the standby mode M2 will be described with reference to a flow chart of FIG. 11.

As illustrated in FIG. 11, in the image processing apparatus 1, when the operation state of the apparatus has transitioned to the standby mode M2 (YES in step S301), it is determined as to whether or not a power outage condition has occurred and as to whether or not a request for the use of the function has been generated (step S302). When it is determined, in these determinations, that the power outage condition has not occurred during the standby mode M2 (NO in step S302), and the request for the use of the function has been made within a certain period of time (YES in step S303), the image processing apparatus 1 causes the operation state of the apparatus to transition to the active mode M1 (step S304) and finishes the process in this case.

On the other hand, when it is determined, in the determination in step S302, that the power outage condition has not occurred during the standby mode M2 (NO in step S302), and the request for the use of the function has not been made within a certain period of time (NO in step S303), the image processing apparatus 1 causes the operation state of the apparatus to transition to the normal time energy-saving mode M4a (step S305) and finishes the process in this case.

Further, on the other hand, when it is determined, in the determination in step S302, that the power outage condition has occurred during the standby mode M2 (YES in step S302), the image processing apparatus 1 causes the operation state of the apparatus to transition to the power outage time energy-saving mode M4b (step S306) and finishes the process in this case.

That is, according to the above-described present embodiment, it is possible to perform a limited functional operation that can be operated with power supplied from the secondary battery 34 in a sudden cut-off condition (power outage condition) of the main power supply caused by power outage and the like, thereby making it possible to improve convenience of a user.

More specifically, according to the present embodiment, it is possible, in a power outage condition, to continuously execute a functional operation that has been in execution since before the occurrence of the power outage condition. Accordingly, it is possible to suppress or prevent occurrence of error notification when the power outage condition is released and returned to a normal state. Further, according to the present embodiment, it is possible to execute a functional operation that is requested by a user in a power outage condition. That is, according to the present embodiment, a fax function and a file server function both of which are important in business situations can be used even during power outage. Therefore, it is possible to prevent a user from missing a business opportunity.

Further, according to the present embodiment, when, in a sudden cut-off condition of the main power supply due to power outage and the like, a functional operation that has been in execution since before the occurrence of the cut-off condition cannot be continued and normally completed with the amount of remaining power of the secondary battery 34, data used in the functional operation is stored in a storage unit without continuing the functional operation. Therefore, it is possible to prevent loss of data or trouble of the apparatus.

Further, according to the present embodiment, since the secondary battery 34 which has a capacity larger than that of a uninterruptible power supply (UPS) which is generally commercially available is loaded, it is possible to execute a functional operation that consumes a large amount of power (such as an image forming operation) even in a sudden cut-off condition of the main power supply caused by power outage and the like.

Although an exemplary embodiment has been described in the above, the present embodiment is not limited to the embodiment described above.

For example, although a configuration in which the charge circuit 33 charges the secondary battery 34 with power supplied from the main power supply 6 has been described in the above embodiment, the present embodiment is not limited thereto. A configuration in which the charge circuit 33 charges the secondary battery 34 with power supplied from an energy generation way other than the main power supply 6 such as light, heat, and regenerative energy conversion is also possible.

Further, although there has not been particularly described in the above embodiment, a charging method of the secondary battery 34 may be set by a user. For example, a user may set any of the following methods: a method in which the secondary battery 34 is charged when the amount of remaining power becomes lower than a threshold value set by a user; a method in which the secondary battery 34 is constantly charged in an operation state where power is supplied from the main power supply 6 such as the active mode M1, the standby mode M2, and the normal time energy-saving mode M4; and a method in which the secondary battery 34 is charged only during night time when electricity usage is low.

Further, although, in the above embodiment, there has been described a case where the operation display unit 51 which is provided with the display unit 51a such as a liquid crystal display on which a touch panel is laminated is used as a display unit for displaying information indicating a list of the functional operations that can be executed in the limited mode M3, information indicating that the functional operation requested by a user is unavailable in the limited mode M3, or information urging replacement of the secondary battery 34, the present embodiment is not limited thereto. For example, it is also possible to use a display unit such as electronic paper which consumes power only when changing information to be displayed on a screen (screen contents) and is capable of maintaining display of information even if the supply of power is cut off. Such a configuration makes it possible to reduce power consumption of the secondary battery 34 during power outage.

Further, although there has not been particularly described in the above embodiment, a power storage unit such as an electrolytic capacitor which is capable of storing power may be provided in the AC/DC power supply generation unit 32 in order to stably supply power to the sub CPU 22a when the supply of power to the sub CPU 22a is switched from the supply of power from the main power supply 6 to the supply of power from the secondary battery 34 due to the occurrence of a power outage condition.

Further, although, in the above embodiment, there has been illustrated the secondary battery 34 as a power supply for supplying power in a power outage condition, the present embodiment is not limited thereto. For example, it is also possible to use another power storage unit such as the above-described electrolytic capacitor provided in the AC/DC power supply generation unit 32.

Further, although, in the above embodiment, there has been described the configuration in which the available operation notification unit 223a notifies a user of information indicating a functional operation that can be executed in the limited mode M3 depending on the amount of remaining power of the secondary battery 34 using the display unit 51a of the operation display unit 51, the present embodiment is not limited thereto. For example, the image processing apparatus 1 can be configured such that the available operation notification unit 223a transmits information to an external device (not illustrated) which is connected thereto through a network (not illustrated) operating by a standby power supply and operates by a standby power supply (such as a UPS) or a battery (secondary battery), the information being for displaying the above-described information indicating the available functional operation on a display unit of the external device, thereby notifying a user who uses the external device of the available functional operation.

Further, although there has not been particularly described in the above embodiment, the image processing apparatus 1 may be configured such that when a data storage process is performed in a power outage condition (see step S111 of FIG. 9, for example) and the power outage condition is thereafter released and returned to a normal state, a functional operation (a fax transmission operation, for example) using data stored by the image processing apparatus 1 (image data for fax transmission, for example) is executed.

Further, although there has not been particularly described in the above embodiment, the image processing apparatus 1 of the present embodiment may be configured so as to operate as a power supply outlet for other electronic devices during power outage.

Further, a program for executing a process in the main CPU 21a or the sub CPU 22a of the above embodiment can be provided by previously incorporating the program in the main memory 23a, the NVRAM 22b, or ROM (not illustrated) of the image processing apparatus 1. Further, the above program can be provided by storing the program in a recording medium which is readable by a computer as a file in an installable or executable form. Further, the above program can be provided or distributed through a network such as the internet.

According to the embodiment, it is possible to execute a functional operation even in a sudden cut-off condition of a main power supply caused by power outage, thereby improving convenience of a user, prevent occurrence of data loss or trouble of the apparatus in the cut-off condition, and execute a functional operation that consumes a large amount of power in the cut-off condition.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
   circuitry configured to:
   detect cut-off of a main power supply;
   store power in a power storage;
   sense an amount of remaining power of the power storage;
   determine whether at least one of a designated functional operation and other functional operations can be completed with the amount of remaining power in a cut-off condition of the main power supply;
   store data related to the functional operation when it is determined that the functional operation cannot be completed with the amount of remaining power;
   display various information on a display; and
   display availabilities of the functional operations and the amount of remaining power of the power storage on the display.

2. The electronic device according to claim 1, wherein the circuitry is further configured to notify a user of a notification indicating that the functional operation is not available when it is determined that the functional operation cannot be completed with the amount of remaining power.

3. The electronic device according to claim 2, wherein the notification is displayed on a display that is capable of maintaining display of information even when supply of power is cut off.

4. The electronic device according to claim 1, wherein the circuitry is further configured to notify a user of a notification indicating an available functional operation in the cut-off condition depending on the amount of remaining power of the power storage.

5. The electronic device according to claim 4, wherein the notification is displayed on a display capable of maintaining display of information even when supply of power is cut off.

6. An electronic device comprising:
   circuitry configured to:
   detect cut-off of a main power supply;
   store power in a power storage;
   sense an amount of remaining power of the power storage;
   determine whether at least one of a designated functional operation and other functional operations can be completed with the amount of remaining power in a cut-off condition of the main power supply;
   receive designation of a functional operation to be executed from a user, wherein the functional operation designated by the user is a functional operation that is designated by the user in execution before or after the cut-off condition occurs;
   store data related to the functional operation when it is determined that the functional operation cannot be completed with the amount of remaining power;
   display various information on a display; and
   display availabilities of the functional operations and the amount of remaining power of the power storage on the display.

7. An electronic device comprising:
   circuitry configured to:
   detect cut-off of a main power supply;
   store power in a power storage;
   sense an amount of remaining power of the power storage;
   determine whether at least one of a designated functional operation and other functional operations can be completed with the amount of remaining power in a cut-off condition of the main power supply;
   store data related to the functional operation when it is determined that the functional operation cannot be completed with the amount of remaining power;
   display various information on a display;
   display availabilities of the functional operations and the amount of remaining power of the power storage on the display; and
   notify a user of a notification indicating time for replacement of the power storage based on a number of times the main power supply is cut off due to power outage.

8. The electronic device according to claim 7, wherein the notification is displayed on a display capable of maintaining display of information even when supply of power is cut off.

9. An image processing apparatus comprising:
   circuitry configured to:
   detect cut-off of a main power supply;
   store power in a power storage;
   sense an amount of remaining power of the power storage;
   determine whether at least one of a designated functional operation and other functional operations can be completed with the amount of remaining power in a cut-off condition of the main power supply;
   display various information on a display; and
   display availabilities of the functional operations and the amount of remaining power of the power storage on the display; and
   notify a user of a notification indicating time for replacement of the power storage based on a number of times the main power supply is cut off due to power outage.

10. A device control method performed in an electronic device that includes a power storage configured to store power, the device control method comprising:
    detecting cut-off of a main power supply;
    sensing an amount of remaining power of the power storage;
    determining whether at least one of a designated functional operation and other functional operations can be completed with the amount of remaining power in a cut off condition of the main power supply;
    displaying various information on a display; and
    displaying, on the display, availabilities of the functional operations and the amount of remaining power of the power storage; and
    notifying a user of a notification indicating time for replacement of the power storage based on a number of times the main power supply is cut off due to power outage.

11. An electronic device comprising:
    circuitry configured to:
    detect cut-off of a main power supply;
    store power in a power storage;
    sense an amount of remaining power of the power storage;

determine whether at least one of a designated functional operation and other functional operations can be completed with the amount of remaining power in a cut-off condition of the main power supply;
store data related to the functional operation when it is determined that the functional operation cannot be completed with the amount of remaining power;
display various information on a display;
display availabilities of the functional operations and the amount of remaining power of the power storage on the display; and
provide a user with an audio notification indicating that the functional operation is available when it is determined that the functional operation can be completed with the amount of remaining power.

* * * * *